(12) United States Patent
Thiery et al.

(10) Patent No.: US 7,757,873 B2
(45) Date of Patent: Jul. 20, 2010

(54) BYPASS VALVE FOR INTERNAL COMBUSTION ENGINES

(75) Inventors: Michael Thiery, Korschenbroich (DE);
Dietmar Miemczyk, Düsseldorf (DE);
Harald Krause, Grevenbroich (DE)

(73) Assignee: PIERBURG GmbH, Neuss (DE)

( * ) Notice: Subject to any disclaimer, the term of this patent is extended or adjusted under 35 U.S.C. 154(b) by 636 days.

(21) Appl. No.: 11/530,127

(22) Filed: Sep. 8, 2006

(65) Prior Publication Data
US 2007/0051105 A1 Mar. 8, 2007

(30) Foreign Application Priority Data
Sep. 8, 2005 (DE) .................. 10 2005 042 679

(51) Int. Cl.
*F16K 39/00* (2006.01)
(52) U.S. Cl. .................. 215/282; 251/129.07
(58) Field of Classification Search ............ 251/129.07, 251/282, 281; 123/339.23, 339.27, 339.28, 123/568.12, 585–586
See application file for complete search history.

(56) References Cited

U.S. PATENT DOCUMENTS

| | | | |
|---|---|---|---|
| 2,141,018 A | | 12/1938 | Ring et al. |
| 2,886,283 A | * | 5/1959 | Natho .................. 251/175 |
| 3,085,590 A | | 4/1963 | McIlhenny |
| 3,519,245 A | | 7/1970 | Hyde |
| 3,601,147 A | * | 8/1971 | Myers .................. 251/282 |
| 4,356,802 A | * | 11/1982 | Kern et al. .............. 123/339.21 |
| 4,702,209 A | * | 10/1987 | Sausner et al. .......... 123/339.27 |
| 5,503,365 A | * | 4/1996 | Backe et al. ............ 251/129.07 |
| 5,525,047 A | * | 6/1996 | Sternenberg et al. ........ 417/307 |
| 5,810,030 A | * | 9/1998 | Uchiyama et al. .......... 137/468 |
| 6,102,366 A | * | 8/2000 | Perez .................. 251/175 |

(Continued)

FOREIGN PATENT DOCUMENTS

CH 91952 7/1920

(Continued)

OTHER PUBLICATIONS

German Office Action issued in corresponding application No. DE 10 2005 042 679.4 dated Jun. 21, 2006.

(Continued)

*Primary Examiner*—John K Fristoe, Jr.
*Assistant Examiner*—Marina Tiet Jen
(74) *Attorney, Agent, or Firm*—Griffin & Szipl, P.C.

(57) ABSTRACT

The invention describes a bypass valve (1) that can be used as a divert air valve. Bypass valves (1) that work in the closed or opened position in a force-balanced or pressure-balanced manner are known. During the opening of the bypass valve (1), a lower pressure is produced in a gap (25) between a valve closing body (3) and a valve seat (20), which pressure destroys the force balance and thus loads a movable valve unit (2) in the closing direction. In order to prevent this, according to the invention pressure equalization openings (24) are embodied or arranged with respect to the gap (25) in such a way that a reduced pressure is introduced into the chambers (7, 8) in the interior of the valve, so that the closing-operative force is distinctly reduced. By these means, the opening times of such a bypass valve can be distinctly reduced.

8 Claims, 2 Drawing Sheets

U.S. PATENT DOCUMENTS 6,871,802 B2 * 3/2005 Stilwell et al. .............. 239/583

FOREIGN PATENT DOCUMENTS

| DE | 1 259 160 | 1/1968 |
| --- | --- | --- |
| DE | 1 942 789 | 3/1970 |
| DE | 2014087 | 11/1970 |
| DE | 197 21 668 A1 | 12/1997 |
| DE | 100 32 902 A1 | 1/2001 |
| DE | 100 20 041 C2 | 5/2003 |
| DE | 102 51 981 A1 | 3/2005 |
| JP | 10184948 | 7/1998 |

OTHER PUBLICATIONS

Kuchling, Von Fachschuldozent Horst, "Physik—Formeln und Gesetze," 1991, pp. 132-135.

Simon, Andrew L., "Basic Hydraulics," 1981, pp. 84-86.

German Office Action issued in corresponding application No. 10 2005 042 679.4 dated Oct. 19, 2006.

* cited by examiner

BYPASS VALVE FOR INTERNAL COMBUSTION ENGINES

This application claims priority from German Patent Application No. 10 2005 042 679.4, filed Sep. 8, 2005, the entire disclosure of which is incorporated herein by reference.

FIELD OF THE INVENTION

The invention relates to a bypass valve for internal combustion engines that controls a bypass channel and features a valve unit that can be moved translationally via an actuator, which valve unit features a valve closing body that corresponds to a valve seat in such a way that an area of higher pressure can be separated from an area of lower pressure, whereby the movable valve unit features pressure equalization openings via which the area of higher or lower pressure is connected to at least one inner chamber of the bypass valve.

BACKGROUND OF THE INVENTION

Such bypass valves, in which an area of higher pressure can be separated from an area of lower pressure by means of a valve and can be connected to the latter, are known for example as divert air valves for internal combustion engines with a turbocharger. They serve to connect the pressure side to the suction side of the turbocharger, by means of which a surging of the turbocharger is prevented in particular during the transition from high load to the divert operation of the combustion engine.

Thus in DE 100 20 041 C2 a bypass valve for connecting the pressure side to the suction side of a turbocharger is described that features a valve rod embodied as the armature of a magnetic circuit and displaceable by means of a drive unit, which valve rod is connected to a valve closing part, whereby the valve head and the valve rod feature pressure equalization holes. In the state of closing and opening the bypass channel, these pressure equalization holes on the movable valve unit serve to achieve an equilibrium of forces with respect to the pneumatic pressures acting axially on the valve unit. For this purpose surfaces of application of force are arranged respectively in the inner chambers of the housing of the valve, which surfaces essentially correspond to the outer surfaces of application of force of the valve, so that an equilibrium of forces ensues by means of the same pressures acting on the same surfaces.

In spite of the arrangement of these pressure equalization openings, however, the opening times of a bypass valve of this type continue to be too long. Also, the required size of the electromagnetic actuators exceeds the theoretical size for activating a force-balanced valve.

It is therefore the object of the invention to create a bypass valve in which the opening time is further reduced in comparison with known valves, whereby at the same time the size of the actuator or the force to be used by the actuator is to be minimized.

SUMMARY OF THE INVENTION

This object is achieved in that the pressure equalization openings are arranged or embodied in such a way that during the opening of the bypass valve, a pressure that is reduced in comparison with the pressure prevailing in the closed state can be introduced into the at least one chamber. Through such an arrangement and embodiment of the pressure equalization openings, it is possible to obtain a valve that is approximately pressure-balanced even during the opening and closing. During the opening, a high flow rate and thus a low pneumatic pressure arises in the gap between the valve closing body and the valve seat due to the small flow cross-section. According to the invention a likewise reduced pressure of approximately the same magnitude acting in the opposite direction is now conducted onto a corresponding surface in the bypass valve so that even during the opening or closing procedure, an approximately force-balanced bypass valve is present as far as the pneumatic pressures are concerned. By these means the opening times can be reduced from approximately 300 to 400 ms down to 50 ms and thus a brief surging of a turbocharger is reliably prevented.

In a preferred form of embodiment the pressure equalization openings on the valve closing body are arranged in the area of the gap between the valve closing body and the valve seat, as a result of which the pressure prevailing there is conducted respectively into the chambers and acts in the opposite direction on the opposite side of the valve unit.

Preferably the pressure equalization openings are formed by small pipes that project axially from the valve closing body into the gap. Due to the insertion of these small pipes the cross-section between the closing body and valve seat is additionally narrowed, so that a local pressure minimum is formed below the opening of the small pipes, which pressure minimum is conducted via the small pipes to the opposite side of the valve unit, as a result of which the closing-operative pressure is distinctly reduced there.

In an alternative form of embodiment, the pressure equalization openings are arranged behind the gap at the valve closing body in the flow direction of the fluid, and a flow obstruction is arranged immediately in front of the pressure equalization openings. By arranging the pressure equalization opening immediately behind the gap and simultaneously arranging the flow obstructions, the flow obstructions are approached at a relatively high speed during the opening of the valve. The small pipe opening itself is situated in the wake, so that the pressure at the small pipe opening drops in comparison with known embodiments. Thus a pressure equalization is approximately achieved even in the dynamic state, i.e. during the opening of a valve. The opening time can also be reduced to below 100 ms by means of such an embodiment.

In a particular further form of embodiment, the pressure equalization openings are formed by small pipes that project axially via the valve closing body into the channel at least on a side facing the gap and form the flow obstruction. Through this embodiment with small pipes, a particularly simple embodiment of the valve closing body is provided, whereby the distinct increase in the rate of opening is maintained.

With these embodiments according to the invention, it is achieved that the opening speeds of a bypass valve can be distinctly increased, whereby only low actuating forces are required for this purpose. Thus for example an electromagnetic actuator can be embodied small. Such bypass valves are thus suitable as divert air valves for turbochargers in internal combustion engines, whereby a brief surging of the turbocharger is reliably avoided due to the short opening times.

Exemplary embodiments of bypass valves are shown in the Figures and are described below.

DETAILED DESCRIPTION OF THE INVENTION

Figure 1:
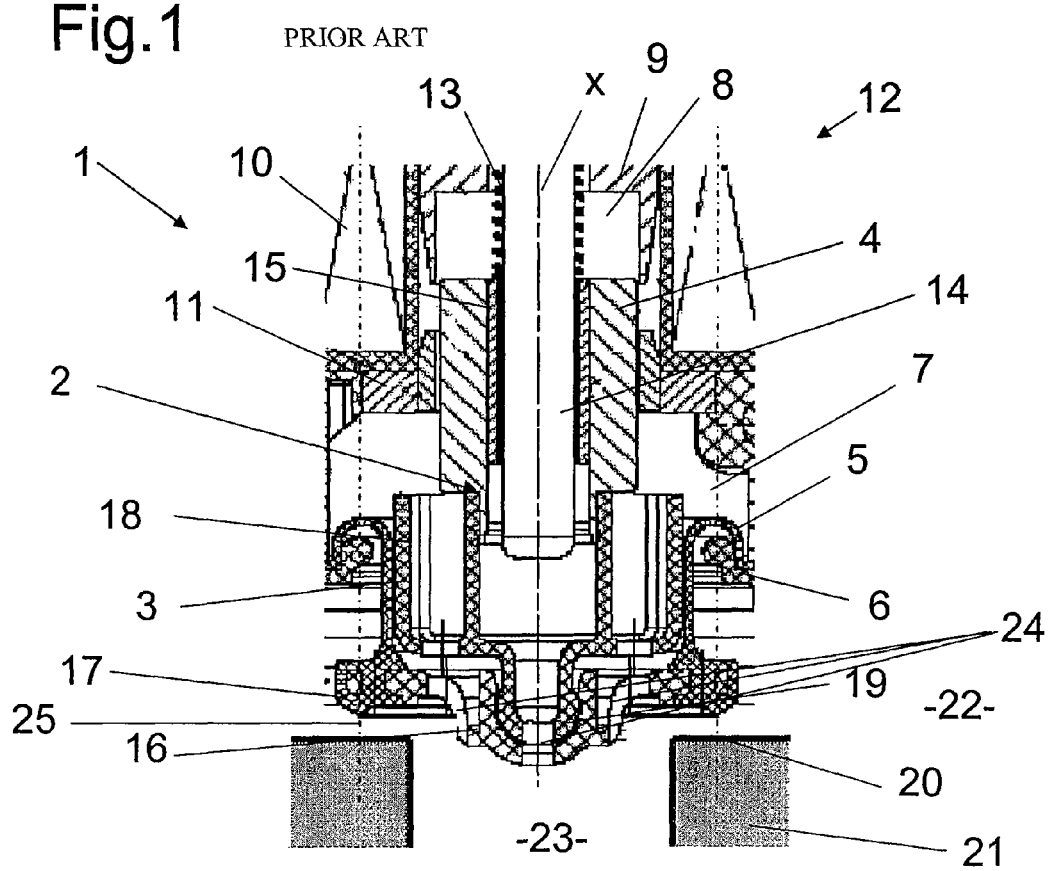
FIG. 1 shows a section of a side view of a bypass valve according to prior art in a sectional view.

The bypass valve 1 shown in FIG. 1 serves as a divert air valve according to the known prior art. It comprises a movable valve unit 2 that is composed essentially of a valve closing body 3 and a movable armature 4 that is connected to the valve closing body 3. Around the valve closing body 3 a membrane 5 is arranged that with its radial outer circumference is fixed to a housing 6 of the bypass valve 1 and whose inner radial circumference is connected to the valve closing body 3, so that a chamber 7 is embodied inside the housing 6. This chamber 7 is in fluid connection with a chamber 8 that is formed between a core 9 of the bypass valve 1 and the armature 4. A coil 10 is arranged around the core 9 for activating the bypass valve 1. The coil 10 as well as the core 9 of the movable armature 4 as well as a back closure plate 11 form a magnetic circuit of an actuator 12 integrated into the bypass valve 1.

A coil spring 13 that is arranged around a valve rod 14 is supported against the core 9, which spring is arranged around a valve rod 14 that in turn is fixed in a hole of the core 9. The opposite end of the spring 13 presses against a guide sleeve 15 that is arranged on the valve rod 14 so that it can slide and is surrounded by the armature 4, so that the armature 4 and thus the valve unit 2 are biased in the closing direction. When the actuator 12 is actuated, i.e. when a voltage is applied to the coil 10, the force of the spring 13 must be overcome in order to move the valve unit 2 in the opening direction.

The valve closing body 3 is composed of a valve head 16, a sealing lip 17 mounted thereon, and a connecting element 18 via which the valve closing body 3 is connected to the armature 4. The connecting element 18 features a ball head 19 via which the valve head 16 is connected by a universal joint to the connecting element 18, so that non-uniformities and tolerances in the area of a valve seat 20 can be compensated for by a slight tilting of the valve head 16.

In the present case the valve seat 20 is arranged on a housing 21 of a turbocharger that can be bypassed via a bypass channel. If the valve unit 2 is now lowered onto the valve seat 20, the bypass channel is closed by means of the sealing lip 17 and thus a pressure side 22 of the turbocharger, on which a higher pressure $p_2$ prevails, is separated from its suction side 23, on which a lower pressure $p_1$ prevails. For the simplified opening of the bypass valve 1, pressure equalization holes 24 are arranged on the valve unit 3, which holes extend through the valve head 16 and the connecting element 18 and produce a fluid connection between the suction side 23 of the turbocharger and the chambers 7 and 8. When the bypass valve 1 is closed, this results in a force balance at the movable valve unit 2, provided that equally effective surfaces are created on which the pressures $p_2$ and $p_1$ act from the respective opposite sides. For this purpose the sealing lip 17 is arranged at the same radial distance from a central axis X as the outer edge of the effective membrane surface. Thus the pressure $p_1$ at the valve closing body 3 acts on a surface up to the sealing lip 17 on the suction side 23 in the opening direction of the valve 1, while in the chambers 7 and 8 the pressure $p_1$ prevails that therefore acts in the opposite direction on the valve unit 2, i.e. in the closing direction, is conducted into the chambers 7 and 8 via the pressure equalization holes 24, and there features equally effective surfaces of application of force. These surfaces are formed by the armature 4 and the membrane 5 or the connecting element 18. It is thus clear that when the bypass valve is closed and also when it is fully opened, an equilibrium of forces is present with respect to the pressures acting directly or indirectly on the valve unit 2. The actuator 12 thus only has to overcome the force of the spring 13 for the opening.

Figure 2:
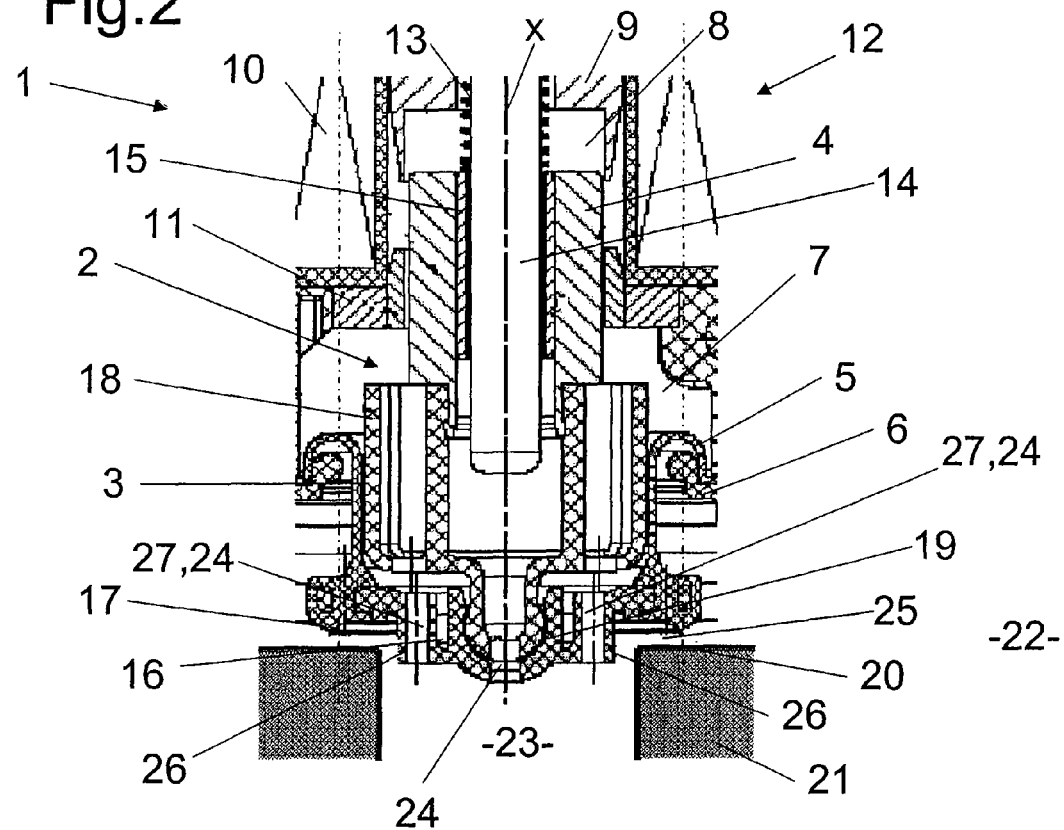
FIG. 2 shows a section of a side view of a first form of embodiment of a bypass valve according to the invention in a sectional view.

The bypass valve 1 according to the invention shown in FIG. 2 essentially features the same construction, so that the reference numbers of FIG. 1 are adopted for the same parts.

When a bypass valve 1 according to FIG. 2 is actuated, it is found that during the opening procedure of the valve 1, a stream of air flows through a gap 25 between the valve seat 20 and the valve head 16 approximately in the position of the movable valve unit 2 shown in the drawing. Due to this flow, the pressure present in the gap 25 drops distinctly, so that the equilibrium of forces on the valve unit 2 is disturbed and an additional force acts on the valve unit 2 in the closing direction, since in chambers 7 and 8 the pressure $p_1$ continues to prevail, whereas in the gap 25 and thus on the valve closing body 3 a distinctly lower pressure $p_3$ is present due to the flow. In order to avoid this, the pressure equalization openings 24 are embodied such that immediately behind the gap 25, seen in the direction of flow, a flow obstruction 26 is arranged, as a result of which the pressure equalization openings 24 are approached by the flow in a different manner. The pressure equalization openings 24 now lie in the wake of the air mass flowing through the gap 25. As a result of this, the pressure at the pressure equalization openings 24 drops compared with the embodiment according to FIG. 1, so that this pressure, which essentially corresponds to the pressure $p_3$ in the gap 25, is transferred into the chamber 7 and a reduction of the pressures acting in chambers 7 and 8 is achieved.

In the embodiment shown, the flow obstructions 26 and the pressure equalization openings 24 are formed by four small pipes 27, two of which can be seen in FIG. 2. By means of such an embodiment, a distinctly faster opening of the valve is achieved due to the pressure equalization which is also aimed at during the opening.

Figure 3:
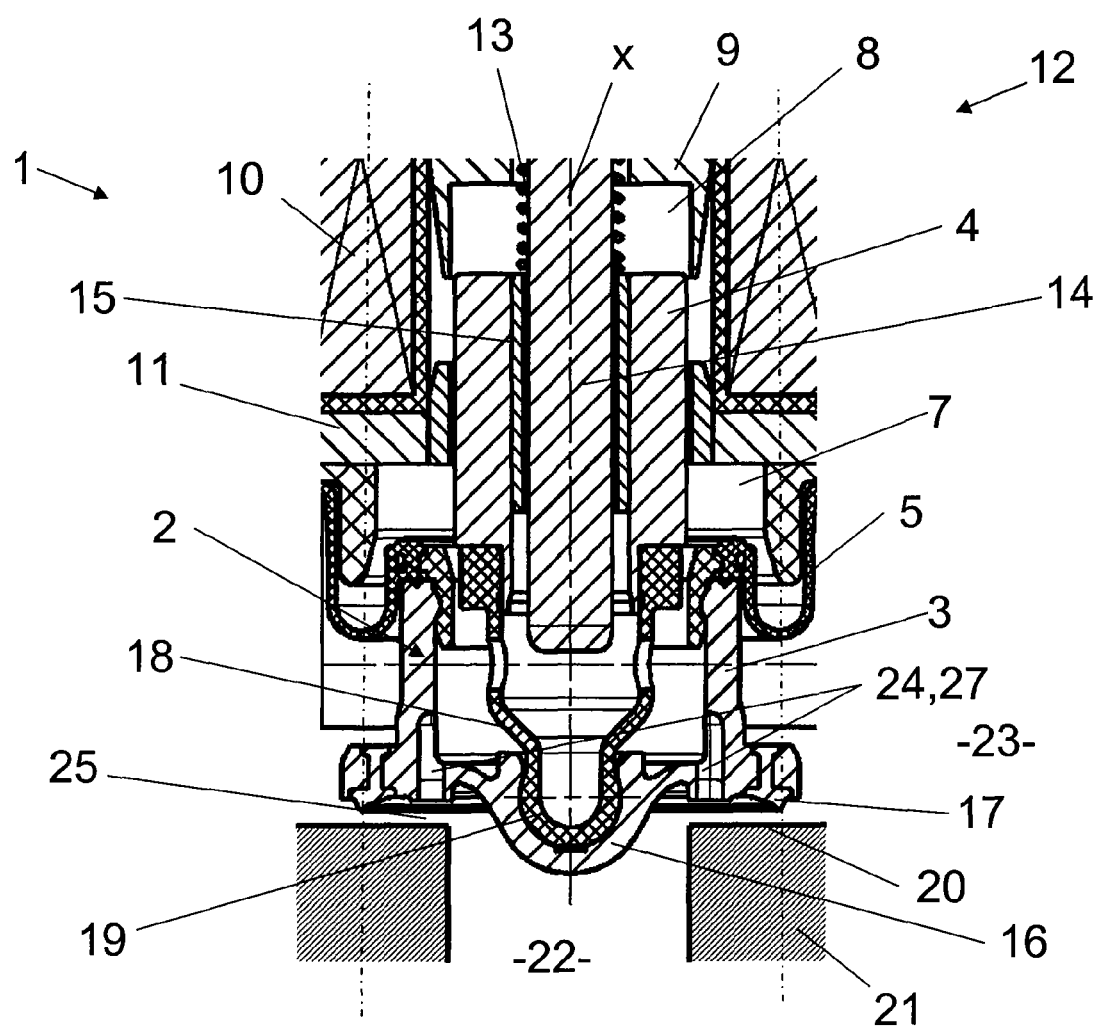
FIG. 3 shows a form of embodiment of a bypass valve according to the invention alternative to FIG. 2 in the same view.

In FIG. 3 an alternative form of embodiment is shown that differs from that shown in FIG. 2 in that the pressure side 22 and the suction side 23 are exchanged in the present exemplary embodiment, so that the membrane 5 is rolled to the other side. Moreover this embodiment does not feature a central pressure equalization opening 24 on the valve closing body 3.

In the embodiment shown here, the pressure equalization openings 24 lie in the area of the gap 25, so that the pressure present there is transferred into the interior of the valve or into the chambers 7 and 8. Thus a pressure reduction takes place in the chambers 7 and 8, as a result of which the closing force in the interior of the valve is distinctly reduced.

It should be evident that with slight modification the bypass valve 1 can be mounted in both directions with respect to the suction side 22 or pressure side 23, without impairing the function of the bypass valve 1. In addition to the arrangement of the pressure equalization openings 24 directly in the area of the gap 25 at the valve closing body 3, the small pipes 27 extend into the gap 25 in the direction of the valve seat 20 farther than the rest of the valve head 16 in this area. As a result of this the cross-section between the small pipes 27 and the valve seat 20 is further narrowed, so that a site of further reduced pressure forms locally below the opening of the small pipes 27. This lower pressure is conducted through the small pipes 27 into the chambers 7, 8, as a result of which the closing pressure $p_2$ that has been present there thus far is reduced even more distinctly. Thus through such an embodiment the closing force is further reduced during the opening procedure, so that a distinctly faster opening of the bypass valve 1 is possible.

In addition, with a valve according to FIG. 3, the valve closing body geometry is changed such that a greater cross-section is made available for the flow, as a result of which the speed is reduced in the gap 25 and thus a somewhat higher pressure prevails between the valve closing body 3 and valve seat 20 than in the embodiment according to FIG. 2. This also leads to a reduction in the closing action of the pressure acting in the interior of the valve in the chambers 7, 8.

The embodiments shown can, of course, also be combined together. Thus for example the ends of the small pipes according to an embodiment according to FIG. 3 can be embodied turned away obliquely from the flow, which would intensify the effect of a lower pressure conducted into chamber 7.

It should be clear that such pressure equalization openings of this type, for the production of a lower effective pressure in the valve, also function with other valves that, for example, are not actuated electromagnetically so that actuating forces can be reduced and opening times minimized. For example, an embodiment of such a bypass valve without a membrane is also conceivable, whereby the same effective surfaces of application of force must be maintained in the chambers 7 and 8 or at the valve head 16 for the force equilibrium.

The invention claimed is:

1. A bypass valve for internal combustion engines that controls a bypass channel and comprises:

a valve unit that can be moved translationally via an actuator, wherein the valve unit comprises a valve closing body that corresponds to a valve seat so that an area of first pressure can be separated from an area of second pressure, whereby the first pressure is higher than the second pressure and the movable valve unit further comprises pressure equalization openings via which the area of higher first pressure or the area of lower second pressure is connected to at least one inner chamber of the bypass valve, wherein the pressure equalization openings are arranged or embodied so that during opening of the bypass valve, a third pressure that is reduced in comparison with the second pressure prevailing in a closed state of the bypass valve can be introduced into the at least one chamber.

2. A bypass valve according to claim 1, wherein the pressure equalization openings on the valve closing body are arranged in an area of a gap between the valve closing body and the valve seat.

3. A bypass valve according to claim 2, wherein the pressure equalization openings are formed by small pipes that project axially from the valve closing body into the gap.

4. A bypass valve according to claim 1, wherein the pressure equalization openings are arranged behind the gap at the valve closing body in a flow direction of fluid, and a flow obstruction is arranged immediately in front of the pressure equalization openings.

5. A bypass valve for internal combustion engines that controls a bypass channel and comprises:

a valve unit that can be moved translationally via an actuator, wherein the valve unit comprises a valve closing body that corresponds to a valve seat so that an area of higher pressure can be separated from an area of lower pressure, whereby the movable valve unit further comprises pressure equalization openings via which the area of higher pressure or the area of lower pressure is connected to at least one inner chamber of the bypass valve, wherein the pressure equalization openings are arranged or embodied so that during opening of the bypass valve, a pressure that is reduced in comparison with a pressure prevailing in a closed state of the bypass valve can be introduced into the at least one chamber, wherein the pressure equalization openings are arranged behind the gap at the valve closing body in a flow direction of fluid, and a flow obstruction is arranged immediately in front of the pressure equalization openings, wherein the pressure equalization openings are formed by small pipes that project axially via the valve closing body into the bypass channel at least on a side facing the gap and form the flow obstruction.

6. A bypass valve according to claim 1, wherein a distinct pressure drop in a gap located between the valve seat and a valve head during opening of the valve due to air flow in the gap is avoided due to the arrangement of a flow obstruction that causes air flow to approach the pressurization equalization openings so as to transfer pressure in the gap to the at least one inner chamber of the valve.

7. A bypass valve according to claim 5, wherein a distinct pressure drop in a gap located between the valve seat and a valve head during opening of the valve due to air flow in the gap is avoided due to the arrangement of a flow obstruction that causes air flow to approach the pressurization equalization openings so as to transfer pressure in the gap to the at least one inner chamber of the valve.

8. A bypass valve for internal combustion engines that controls a bypass channel and comprises:

a valve unit that can be moved translationally via an actuator, wherein the valve unit comprises a valve closing body that corresponds to a valve seat so that an area of higher pressure can be separated from an area of lower pressure, whereby the movable valve unit further comprises pressure equalization openings via which the area of higher pressure or the area of lower pressure is connected to at least one inner chamber of the bypass valve, wherein the pressure equalization openings are arranged or embodied so that during opening of the bypass valve, a pressure that is reduced in comparison with a pressure prevailing in a closed state of the bypass valve can be introduced into the at least one chamber, wherein the pressure equalization openings are arranged behind the gap at the valve closing body in a flow direction of fluid, and a flow obstruction is arranged immediately in front of the pressure equalization openings.

* * * * *